(12) United States Patent
Florence

(10) Patent No.: US 6,842,559 B1
(45) Date of Patent: Jan. 11, 2005

(54) METHOD AND APPARATUS FOR ADDING OR DROPPING A COMPONENT OF AN OPTICAL SIGNAL

(75) Inventor: James M. Florence, Dallas, TX (US)

(73) Assignee: Raytheon Company, Lexington, MA (US)

( * ) Notice: Subject to any disclaimer, the term of this patent is extended or adjusted under 35 U.S.C. 154(b) by 384 days.

(21) Appl. No.: 10/053,026

(22) Filed: Jan. 18, 2002

(51) Int. Cl.[7] .............................. G02B 6/28; G02B 6/42; H02J 14/02
(52) U.S. Cl. .............................. 385/24; 385/47; 385/34; 398/79; 398/84; 398/82
(58) Field of Search ................................ 385/24, 31–37, 385/51, 52; 398/81, 84, 87, 79, 85, 86, 82, 83

(56) References Cited

U.S. PATENT DOCUMENTS

| | | | | |
|---|---|---|---|---|
| 5,796,889 A | * | 8/1998 | Xu et al. ....................... | 385/24 |
| 6,055,347 A | * | 4/2000 | Li et al. ........................ | 385/34 |
| 6,198,857 B1 | * | 3/2001 | Grasis et al. ................. | 385/24 |
| 6,320,996 B1 | * | 11/2001 | Scobey et al. ................ | 385/18 |
| 6,445,841 B1 | * | 9/2002 | Gloeckner et al. ............ | 385/17 |
| 6,449,407 B1 | * | 9/2002 | Kiang et al. .................. | 385/18 |
| 6,636,654 B2 | * | 10/2003 | McGuire, Jr. ................ | 385/17 |

OTHER PUBLICATIONS

U.S. Ser. No. 10/052,940 filed Jan. 18, 2002, entitled "Method and Apparatus for Adding and Dropping Optical Signal Components", by inventors Clay E. Towery et al., 35 pages of text and 6 pages of drawing.

Angus Macleod, "Tutorial on the Design of Telecommunication Filters", Thin Film Center, Inc., Tucson, Arizona, 58 pages, date unknown.
"Corning Unveils Breakthrough in DWDM Filter Components", Corning Incorporated, Corning, New York, Oct. 1, 2001, 2 pages.
"A Compact Answer to a Huge Question", Corning Incorporated, Endicott, New York, 2001 1 page.
"100 GHZ Optical Add/Drop Multiplexer (1 x 2)", Oplink Communications, Inc., pp. 23–24.
"Applications Data—terra Q DWDM Optical Channel Filters", Cierra Photonics, Inc., Santa Rosa, California, 6 pages, date unknown.
Angus MacLeod, "Challenges in Design and Production of Narrow Band Filters for Optical Fiber Telecommunications", Thin Film Center, Inc., Tucson, Arizona, 44 pages, date unknown.

* cited by examiner

Primary Examiner—Layla G. Lauchman
(74) Attorney, Agent, or Firm—Baker Botts L.L.P.

(57) ABSTRACT

An optical add/drop multiplexer (10, 110) includes a primary input port (16, 21), an express output port (17, 22), an add input port (18, 23), and a drop output port (19, 24). Radiation from the primary input port is reflected by a thin film filter (26), is routed back to the filter by a redirecting arrangement (38, 151–153, 251), is then reflected again by the filter 26, and then travels to the express output port. A signal component from the primary input port at a predetermined wavelength is extracted by the filter as it effects the first reflection, and is supplied to the drop output port. An add signal from the add input port is directed by the filter to the express output port.

22 Claims, 5 Drawing Sheets

… (1)

METHOD AND APPARATUS FOR ADDING OR DROPPING A COMPONENT OF AN OPTICAL SIGNAL

TECHNICAL FIELD OF THE INVENTION

This invention relates in general to techniques for adding or dropping a component of an optical signal and, more particularly, to such techniques which utilize a filter that passes radiation at a predetermined

BACKGROUND OF THE INVENTION

Telecommunications is a field which has been rapidly evolving over the past twenty years, fueled in part by the progressively increasing popularity of technology such as cellular telephones, facsimile machines and computer communications that use the Internet. Due to these growing new technologies, there has been a progressively increasing demand for telecommunications equipment with greater information-carrying capacity, which in turn has created a progressively increasing focus on the use of optical signals to effect communications.

Currently, when existing systems need to process an optical signal, they typically convert the optical signal into an electrical signal, then process the electrical signal, and then convert the processed electrical signal back into an optical signal. This greatly delays propagation of information through the system, and is expensive because it increases the complexity of the system. In order to avoid these types of problems, there is a progressively growing demand for equipment that can directly process optical signals, without temporarily converting them into electrical signals.

On existing type of device which can directly process optical signals is an optical add/drop multiplexer (OADM). The multiplexer has a primary input, an express output, an add input, and a drop output. The primary input receives an optical signal having several components at respective different wavelengths. The multiplexer extracts one of these components signals and supplies it to the drop output, and routes the remaining signal components to the express output. Simultaneously, the multiplexer can accept at its add input an add signal component at the predetermined wavelength, which it supplies to the express output.

While existing multiplexers of this type have been generally adequate for their intended purposes, they have not been satisfactory in all respects. In this regard, a small portion of the energy of the signal component that is to be sent to the drop output may leak through to the express output, where it can cause interference with the add signal component, due to the fact that they have the same wavelength. In a high-performance application, the isolation at the express output of the drop signal component with respect to other signal components may need to be as high as ~23 dB, or even higher, but existing approaches that can achieve this level of performance typically involve a higher number of parts and a higher cost than is desirable. Another problem is that a small portion of the add signal may leak through to the drop output, where it can interfere with the drop signal component.

SUMMARY OF THE INVENTION

From the foregoing, it may be appreciated that a need has arisen for a method and apparatus for efficiently separating and/or combining optical signals. According to the present invention, a method and apparatus are provided to address this need, and involve: causing optical radiation traveling along a first optical path to impinge on an optical filter having a predefined passband in a manner so that a portion of the radiation from the first optical-path which is within the passband passes through the filter and a remaining portion of the radiation from the first optical path is reflected and travels along a second optical path; causing optical radiation traveling along a third optical path to impinge on the filter in a manner so that a portion of the radiation from the third optical path which is within the passband passes through the filter and a remaining portion of the radiation from the third optical path is reflected and travels along a fourth optical path, the first, second, third and fourth optical paths being different from each other; and redirecting optical radiation traveling away from the filter along the second optical path in a manner so that it travels toward the filter along the third optical path.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
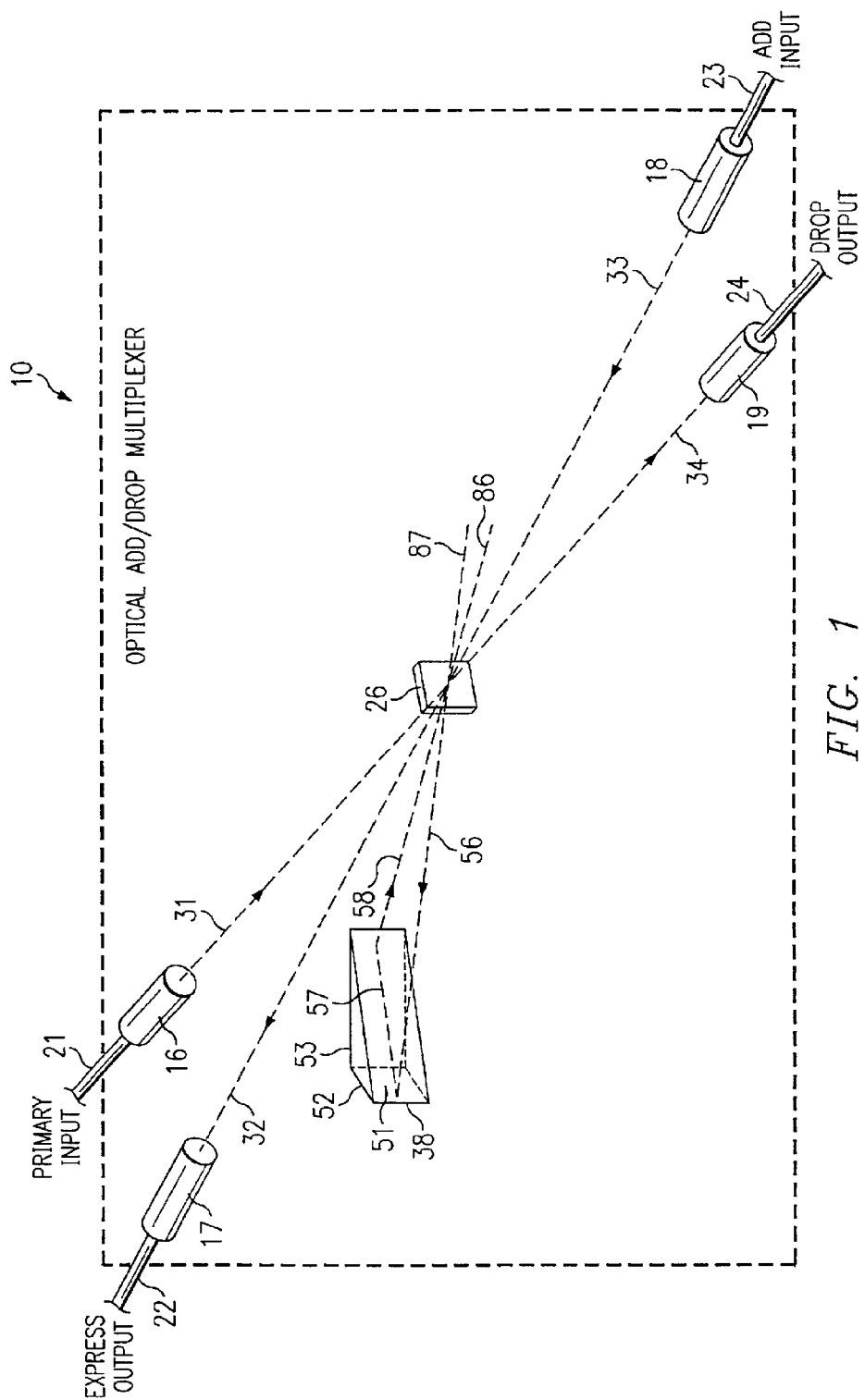
FIG. 1 is a diagrammatic view of an optical add/drop multiplexer which embodies aspects of the present invention.

FIG. 1 is a diagrammatic view of an apparatus which is an optical add/drop multiplexer (OADM) 10. The multiplexer 10 includes four lenses 16–19, which are each physically coupled to a respective one of four optical fibers 21–24 that each extend to a location external to the multiplexer 10.

Each of the lenses 16–19 is a collimating lens of a known type. In the disclosed embodiment, each collimating lens 16–19 is an approximately cylindrical optical element made from fused silica with a uniform composition. Each of the lenses 16–19 has a flat end which is fused to an end of the associated optical fiber. The opposite end of each of the lenses 16–19 has a slightly curved surface. The lenses 16–19 are of a type which is commercially available and known to persons skilled in the art, and thus the lenses 16–19 are not described here in further detail. One suitable lens is available as part number FSL4.438-1.250B3 from LightPath Technologies of Albuquerque, N. Mex. Alternatively, each of the lenses 16–19 could be a graded index (GRIN) lens of a known type.

The optical fibers 21–24 are each a single mode fiber of a type known to persons skilled in the art. One suitable fiber is available as part number SMF-28 from Corning Incorporated of Corning, N.Y. Each of the fibers has a cylindrical core, a cladding which concentrically surrounds the core, and an acrylate coating which concentrically surrounds the cladding. Each fiber has an end portion which is disposed against and fixedly secured to the flat outer end surface of the associated one of the lenses 16–19. In the disclosed embodiment, the end of each fiber is secured to the associated lens by a laser fusion technique which is known in the art. However, the fibers could be secured to the lenses in some other suitable manner, for example using an adhesive.

Before discussing the internal structure and operation of the optical add/drop multiplexer 10, it is helpful to first identify the input and output ports of the multiplexer 10, and explain the various signals which enter and exit the multiplexer 10 through the input and output ports. In this regard, the fiber end 21 and lens 16 define a primary input port, the fiber end 23 and lens 18 define an add input port, the lens 19 and fiber end 24 define a drop output port, and the lens 17 and fiber end 22 define an express output port.

The primary input port receives through fiber 21 and lens 16 an optical signal that includes several signal components at respective different wavelengths. The multiplexer 10 extracts one of these components, which has a predetermined wavelength, and then outputs this component through the lens 19 and fiber end 24 which serve as the drop output port. The remaining optical signal components from the primary input are all directed to the express output port defined by the lens 17 and fiber end 22. A single signal component at the predetermined wavelength can be introduced into the multiplexer 10 through the add input port defined by the fiber end 23 and the lens 18. The multiplexer 10 supplies the add signal component to the express output port defined by the lens 17 and fiber end 22. Thus, the fiber 22 carries the add signal component received through the fiber 23 of the add input port, as well as all signal components from the input signal received through the fiber 21 of the primary input port, except for the signal component at the predetermined wavelength which is extracted from the primary input signal and supplied through the drop output port to the fiber 24.

Turning in more detail to the internal structure of the multiplexer 10, a thin film filter (TFF) 26 is provided at a central location, with the lenses 16–17 disposed on one side thereof, and the lenses 18–19 disposed on the other side thereof. The filter 26 is a component of a type known to persons skilled in the art. One suitable filter is commercially available as part number 1668314 from Elcan Optical Technologies of Midland, Ontario, Canada. However, the filter 26 could alternatively be a custom manufactured part.

Figure 2:
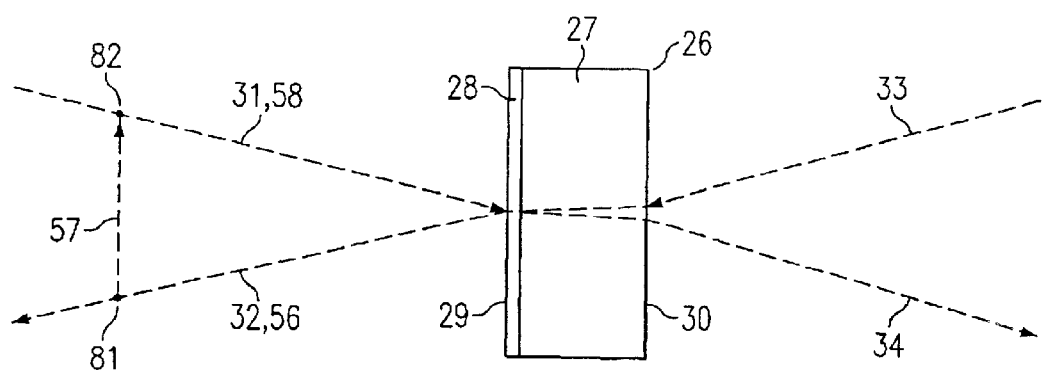
FIG. 2 is a diagrammatic top view of a thin film filter which is a component of the multiplexer of FIG. 1.

FIG. 2 is a diagrammatic top view of the filter 26. Since the filter 26 is a component of a known type, the structure of the filter 26 is described here only briefly, for purposes of facilitating an understanding of the present invention. More specifically, with reference to FIG. 2, the filter 26 includes a glass plate 27 which has on one side thereof a filtering section 28. The filtering section 28 includes several separate layers which are not separately illustrated. The filtering section 28 is relatively thin in comparison to the thickness of the glass plate 27. For example, the glass plate may have a thickness of approximately 1 mm, whereas the filtering section 28 may have an overall thickness of approximately 30 to 60 μm. The filter 26 has, on opposite sides thereof, parallel outer surfaces 29 and 30. The surface 30 has a very thin coating of a known anti-reflective material, which is not separately shown in FIG. 2. The operation of the filter 26 is explained in more detail later.

Referring again to FIG. 1, optical radiation which enters the primary input port of the multiplexer 10 through the fiber 21 and lens 16 travels to the filter 26 along an optical path 31. Optical radiation which is destined to exit the multiplexer 10 through the express output port travels from the filter 26 to the lens 17 and fiber 22 along an optical path 32. Optical radiation which enters the add input port of the multiplexer 10 through the fiber 23 and lens 18 travels to the filter 26 along an optical path 33. Optical radiation destined to exit the multiplexer 10 through the drop output port travels from the filter 26 to the lens 19 and fiber 24 along an optical path 34.

The multiplexer 10 includes a prism 38. In the disclosed embodiment, the prism 38 is made from a material which is available from a number of manufacturers and which is commonly known in the art as BK7 glass, but it could alternatively be made from some other suitable material. The prism 38 has parallel top and bottom surfaces, a planar front surface 51, and two planar reflection surfaces 52 and 53. The front surface 51 is coated with a thin and not-illustrated layer of a known anti-reflective material. The surfaces 51–53 are arranged in a manner which gives the prism 38 a generally triangular shape. Although the prism is shown in FIG. 1 as a part which is separate from the lenses 16 and 17, it will be recognized that the prism 38 and the lenses 16–17 could alternatively be integrated into a single part, and this part could be made by a molding technique.

Optical radiation travels from the filter 26 to the prism 38 along an optical path 56, which extends through the front surface 51 and the material of the prism to the reflection surface 52. The reflection surface 52 has the material of the prism on the inner side thereof, and air on the outer side thereof. Due to the difference between the indexes of refraction for air and the prism material, and due to the angle of incidence of the optical path 56 with respect to the surface 52, radiation traveling along the path 56 is subjected to total internal reflection (TIR) at the surface 52, with a high degree of efficiency involving virtually no loss of energy. This reflected radiation then travels along an optical path 57 to the reflection surface 53, where a further total internal reflection occurs. After the second reflection, the radiation travels from the reflection surface 52 to the filter 26 along an optical path 58 which extends through the material of the prism and through the front surface 51. The optical paths 56 and 58 intersect at a point in the region of the surface 29 (FIG. 2) on the filter 26.

The prism 38 is oriented so that the top and bottom surfaces are each parallel to an imaginary plane containing the optical paths 56–58, and so that the front surface 51 and reflection surfaces 52–53 are each perpendicular to the plane containing the optical paths 56–58. It will be recognized that the reflection surfaces 52 and 53 form an angle with respect to each other which is slightly less than 90°, so that radiation received by the prism 38 from the filter 26 along the optical path 56 will be appropriately directed back to the filter 26 along the optical path 58.

Figure 3:
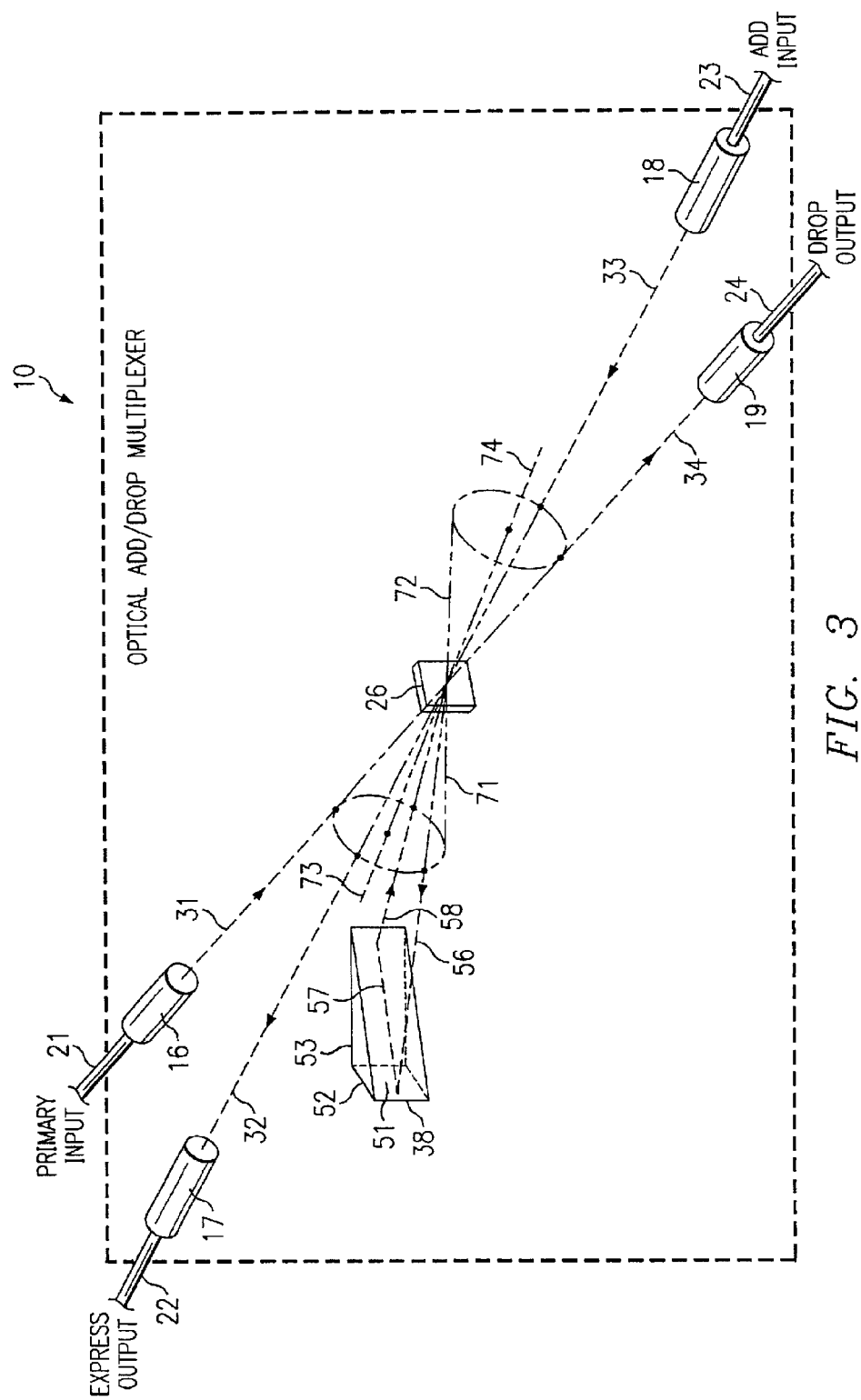
FIG. 3 is a diagrammatic view which is similar to FIG. 1 and shows the multiplexer of FIG. 1, but with the addition of two imaginary cones that facilitate an understanding of certain spatial relationships within the multiplexer.

FIG. 3 is a diagrammatic view generally similar to FIG. 1, but also shows two imaginary right circular cones 71 and 72, which are located on opposite sides of the filter 26. Although the cones 71 and 72 are imaginary, they help to explain the positions of the optical paths 31–34, 56 and 58 with respect each other, and with respect to the filter 26. The cones 71 and 72 have respective central axes 73 and 74 which are coaxial, and which are each perpendicular to the surfaces 29 and 30 (FIG. 2) of the filter 26. The cone 71 has its apex located substantially at the surface 29 (FIG. 2) of the filter 26, and the cone 72 has its apex located within the filter 26, a very small distance from the surface 29.

The optical axes 31–32, 56 and 58 are each contained within the conical side surface of the cone 71, and are uniformly angularly spaced around the central axis 73 of the cone 71. That is, the circumferential spacing between each adjacent pair of optical paths is 90°. In a similar manner, the optical paths 33–34 are contained in the conical side surface of the cone 72, and are angularly spaced by $_{90}$° from each other about the central axis 74 of the cone 72. Although the optical paths associated with each cone in the disclosed embodiment are separated by a circumferential spacing of 90°, persons skilled in the art will recognize that the invention also encompasses other configurations of circumferential spacing.

It will be noted that the optical axes 31–32, 56 and 58 all form the same angle with respect to the central axis 73 of the cone 71. In the disclosed embodiment, this angle is approximately 1.8°. The drawings exaggerate the size of this angle, for purposes of clarity in disclosing the present invention. In a similar manner, the optical paths 33 and 34 each form an angle of 1.8° with respect to the axis 74 of the cone 72. This angle of 1.8° is a manufacturer-specified angle at which radiation must impinge on the filter 26 in order to ensure accurate and optimum filtering and efficiency of the filter 26. It will be noted that, since the central axes 73 and 74 of the cones 71 and 72 are each perpendicular to the surfaces 29 and 30 (FIG. 2) of the filter 26, radiation which arrives at the angle of 1.8° will be reflected at the same angle of 1.8°. Although the filter 26 in the disclosed embodiment has a manufacturer-specified angle of 1.8°, it will be recognized that the size of the angle could be different, for example where some other similar filter was used and was designed to work optimally with a different angle.

Referring to FIGS. 1 and 2, the operation of the multiplexer 10 will now be described. It will be noted that, since FIG. 2 is a top view, the optical path 58 is directly beneath a portion of the optical path 31, and the optical path 56 is directly beneath a portion of the optical path 32. Consequently, a single broken line is used in FIG. 2 to designate both the optical path 31 and also the optical path 58, but it should be remembered that, as shown in FIG. 1, they are not coextensive. Similarly, the optical paths 32 and 56 are designated in FIG. 2 by a single broken line but, as evident from FIG. 1, they are not coextensive.

As mentioned earlier, optical radiation arriving at the primary input port through the fiber 21 and lens 16 includes a plurality of signal components at respective different wavelengths. The signal components all travel to the filter 26 along the optical path 31. At the filter 26, the filtering section 28 is designed to pass radiation having a predetermined wavelength (which corresponds to one component of the input signal), and to reflect radiation at all other wavelengths (which corresponds to all other components of the input signal).

Thus, signal components traveling along the optical path 31 which are not at the predetermined wavelength are reflected at the surface 29 by the filtering section 28, and thereafter travel along the optical path 56 toward the prism 38. The signal component at the predetermined wavelength which is traveling along the optical path 31 is allowed to pass through the filtering section 28 and the glass 27 of the filter 26, and then travels along the optical path 34 to the lens 19 and fiber 24 that serve as the drop output port.

The filtering section 28 should ideally pass all energy of the signal component at the predetermined wavelength. As a practical matter, however, even though the majority of the energy of this signal component passes through the filter 26, a small portion of the energy is reflected and travels along the optical path 56 toward the prism 38, along with the reflected signal components at all other wavelengths. This unwanted reflection is referred to in the art as the "in-band" reflection characteristic of the filter 26. Expressing the magnitude of the energy of the unwanted reflection in relation to the energy of the desired reflection, the filter 26 has an inband reflection characteristic which is in the range of approximately −15 dB to −20 dB. In a sense, this unwanted energy at the predetermined wavelength constitutes optical noise in the signal which is traveling along the optical path 56.

In the prism 38, all of the radiation traveling along optical path 56 is reflected by the reflection surface 52 (corresponding to point 81 in FIG. 2). Then, this radiation travels along optical path 57, is reflected by the reflection surface 53 (corresponding to point 82 in FIG. 2), and then travels along optical path 58 to the filter 26. Thus, all of this radiation arrives back at substantially the same point on the filter 26 from which it was previously reflected, and at the same angle, but along a different optical path.

As all of this radiation from the prism 38 arrives at the filter 26 along the optical path 58, the signal components which are at wavelengths other than the predetermined wavelength are reflected at the surface 29 by the filtering section 28, and thereafter travel along the optical path 32 to the lens 17 and fiber 22 that serve as the express output port. To the extent that the optical radiation traveling along the optical path 58 includes a residual portion of the energy of the input signal component at the predetermined wavelength, most of this residual radiation passes through the filtering section 28 and the glass plate 27 of the filter 26, and thereafter travels along an optical path 86 (FIG. 1), which does not lead to any optical component. Thus, this optical radiation on optical path 86 will essentially be dissipated within the multiplexer 10.

Although most of this residual radiation at the predetermined wavelength from the optical path 58 passes through the filter 26 to the optical path 86, a very small portion of it may be reflected by the filtering section 28, such that this reflected portion then travels along the optical path 32 to the lens 17 and fiber 22 of the express output port. However, this will represent a virtually negligible amount of energy at the predetermined wavelength, in comparison to the energy level of the signal components at each of the other wavelengths that are traveling along the optical path 32. In this regard, and as noted above, the filter 26 of the disclosed embodiment has an in-band reflection characteristic of approximately −15 dB to −20 dB. Thus, optical energy at the predetermined wavelength which undergoes unwanted reflection from the optical path 31 to the optical path 56 will have a lower energy level than radiation at other wavelengths traveling along the optical paths 56, 57 and 58, by −15 dB to −20 dB. To the extent that a portion of this energy at the predetermined wavelength then undergoes a second unwanted reflection from the optical path 58 to the optical path 32, it will have an even lower energy level along the path 32 than radiation at other wavelengths, by −30 dB to −40 dB.

At the same time that all of the foregoing is taking place, an optical add input signal at the predetermined wavelength can be supplied to the add input port of the multiplexer 10 through the fiber 23 and lens 18, and will then travel along the optical path 33 to the filter 26. A very small portion of the energy of this add signal may be reflected by the filtering section 28, and would then travel along the optical path 86, which does not lead to any optical component, and which would thus cause the reflected energy to be dissipated within the multiplexer 10. However, the majority of the energy from the add signal on optical path 33 passes entirely through the filter 26, and then travels along the optical path 32 to the lens 17 and fiber 22 of the express output port, along with all of the signal components at other wavelengths which were derived from the input signal received through the primary input port.

Figure 4:
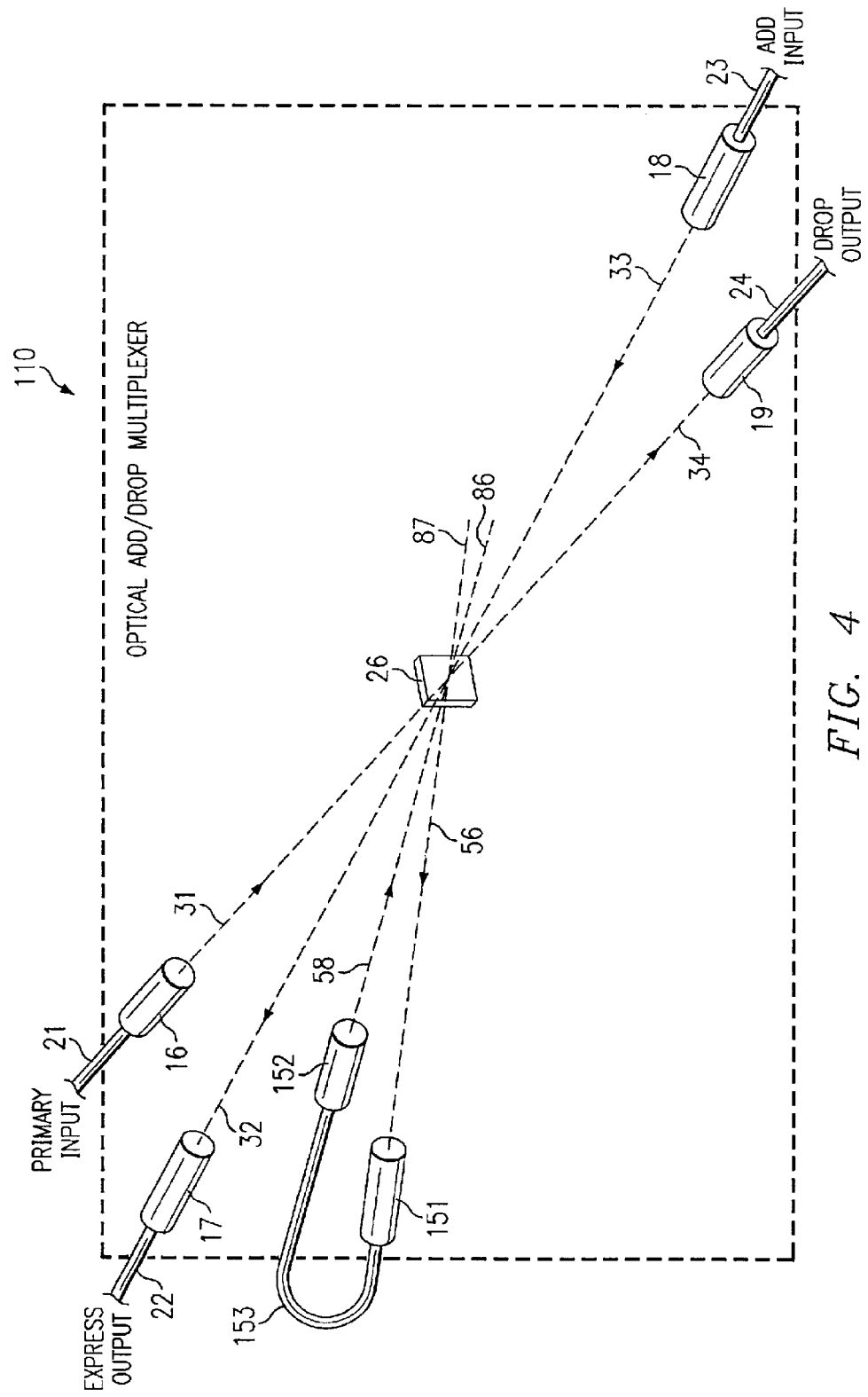
FIG. 4 is a diagrammatic view similar to FIG. 1, but showing an optical add/drop multiplexer which is an alternative embodiment of the multiplexer of FIG. 1.

FIG. 4 is a diagrammatic view similar to FIG. 1, but shows an optical add/drop multiplexer 110 which is an alternative embodiment of the multiplexer 10 of FIG. 1. In FIG. 4, components which are identical to components in FIG. 1 are identified with the same reference numerals. The following discussion focuses on the differences. More specifically, the multiplexer 110 of FIG. 4 is effectively identical to the multiplexer 10 of FIG. 1, except that the prism 38 of FIG. 1 has been replaced in the embodiment of FIG. 4 with two lenses 151 and 152, and an optical fiber 153.

The lenses 151 and 152 are identical to the lenses 16–19. The lenses 151 and 152 are each cylindrical, each have a curved surface at an end nearest the filter 26, and each have a substantially flat surface at the opposite end. The optical fiber 153 is the same type of optical fiber used for the fibers 21–24. The fiber 153 has each end fused to the center of the flat surface on a respective one of the lenses 151 and 152. The depiction of the fiber 153 in FIG. 4 is diagrammatic, and the fiber 153 may actually be relatively long in order to route it from the lens 151 to the lens 152 without bending it to an extent that would cause stress or damage to the fiber.

Radiation traveling away from the filter 26 along the optical path 56 is collimated by the lens 151, and directed into the fiber 153. This radiation passes through the fiber 153, and then is focused by the lens 152 and directed so as to travel along the optical path 58 to the filter 26. In other respects, the operation of the multiplexer 110 is similar to the operation of the multiplexer 10 of FIG. 1.

Figure 5:
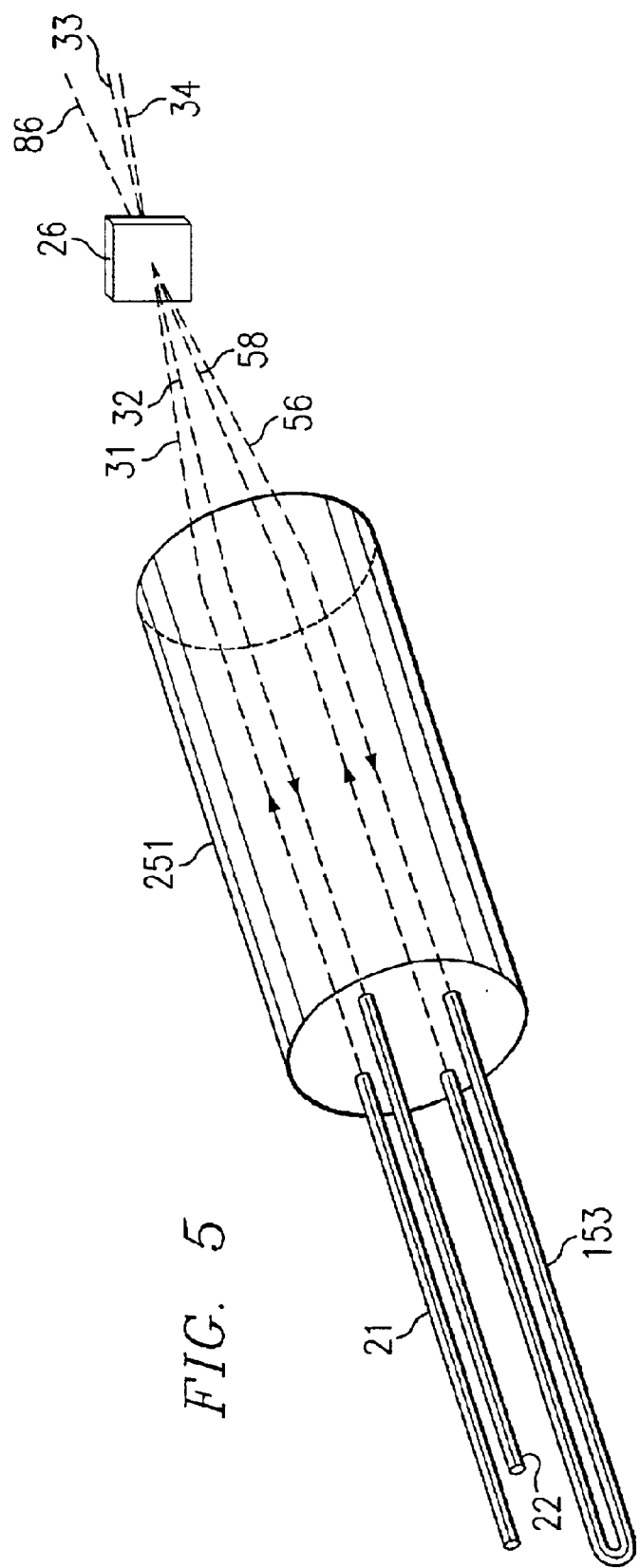
FIG. 5 is a diagrammatic view of selected components from an optical add/drop multiplexer which is an alternative embodiment of the multiplexer of FIG. 4.

FIG. 5 is a diagrammatic view of selected components from an optical add/drop multiplexer which is an alternative embodiment of the multiplexer of FIG. 4. The embodiment of FIG. 5 is identical to the embodiment of FIG. 4, except that the four lenses 21–22 and 151–152 in FIG. 4 have all been replaced with a single lens 251. The lens 251 is similar to any one of the lenses 21–22 and 151–152, except that it may have a larger diameter. The lens 251 has a curved surface on the end thereof nearest the filter 26, and has a substantially flat surface at the opposite end thereof. Ends of the fibers 21–22 and 153 are fused to the flat surface of the lens 251, at respective locations offset radially from a central axis of the lens 251. The embodiment of FIG. 5 includes lenses and fibers comparable to those shown at 18–19 and 23–24 in FIG. 4, but they have been omitted from FIG. 5 for clarity.

Operation of the embodiment of FIG. 5 is somewhat similar to operation of the embodiment of FIG. 4. Radiation arriving at the primary input port through the optical fiber 21 is focused by the lens 251 and directed to travel along the optical path 31 to the filter 26, where a portion of the radiation at a selected wavelength passes through the filter 26 to the optical path 34. Radiation at other wavelengths, and a small portion of the energy of the radiation at the selected wavelength, is reflected by the filter 26, and travels to the lens 251 along the optical path 56. The radiation from path 56 is collimated by the lens 251, and then it passes through the fiber 153 and returns to the lens 251. The lens 251 focuses the radiation received from the fiber 153, and directs it to travel back to the filter along the optical path 58.

To the extent that radiation traveling along the optical path 58 includes energy at the selected wavelength, the majority of this energy passes through the filter 26 to the optical path 86. The filter 26 reflects radiation from the path 58 which is at wavelengths other than the selected wavelength, along !with a very small portion of the radiation energy from the path 58 which is at the selected wavelength, and this reflected radiation from the path 58 then travels along the optical path 32 toward the lens 251. The majority of the radiation at the selected wavelength which arrives at the filter 26 from the add input port along the optical path 33 passes through the filter 26, and then travels toward the lens 251 along the optical path 32. The lens 251 collimates the radiation which it receives from the optical path 32, and then directs this radiation into the fiber 22 associated with the express output port.

The present invention provides a number of technical advantages. One such technical advantage results from the fact that a redirecting arrangement is used to cause signal components traveling from an input port to an output port to be reflected twice from a single filter. This permits a single filter with an in-band reflection characteristic of −15 dB to −20 dB to provide twice this degree of isolation with respect to a drop signal component, in particular on the order of about −30 dB to −40 dB of isolation. This permits a high degree of isolation to be achieved with a filter that is substantially cheaper than any filter which could provide good isolation for a single reflection of signal components. A redirecting arrangement such as a prism, or such as a loop-back fiber with one or two lenses, is cheaper than the type of filter being used, and thus the approach according to the invention is cheaper than any approach that might use two or more filters to attempt to achieve a high degree of isolation, and also avoids any need to attempt to match characteristics of filters that are being paired with each other.

Another advantage results from the fact that the disclosed configurations are compact and provide a high level of performance, but have minimal parts counts and minimal cost. Another advantage is that any in-band reflection of an add signal by the filter is directed away from optical components for dissipation within the multiplexer, in a manner so that none of the reflection is superimposed onto a drop signal traveling to a drop output.

Still another advantage results where a prism is used to redirect energy reflected from the filter back toward the filter, because the prism provides two reflective surfaces that are precisely aligned in a single part of low cost. Further, due to the fact that the two reflections in the prism are each effected in the form of a total internal reflection, each reflection occurs with an extremely low loss of energy. It is also advantageous where the redirection is alternatively effected using a loop-back fiber with one or two lenses. This configuration effects redirection with no significant loss of energy, and the cost of the fiber and lenses is low, thereby minimizing manufacturing costs.

Although selected embodiments have been illustrated and described in detail, it will be understood that various substitutions and alterations can be made therein without departing from the scope of the present invention. For example, there are various ways to adjust the positional relationships of the optical paths with respect to each other, the filter, the prism, and/or other components, while still utilizing one or more aspects of the present invention. Further, the add input or drop output could be omitted from the multiplexer, while still utilizing aspects of the present invention. In addition, the prism could be replaced with some other form of redirecting arrangement, such as a pair of highly reflective mirrors.

Moreover, although the present invention is disclosed in the specific context of an optical add/drop multiplexer, it will be recognized that the invention could be applied in a variety of other applications, in order to achieve a high in-band isolation characteristic through use of a filter with a low to medium in-band reflectance characteristic. Other substitutions and alterations are also possible without departing from the spirit and scope of the present invention, as defined by the following claims.

What is claimed is:

1. An apparatus comprising:

an optical filter having a predefined passband, said filter being responsive to optical radiation which impinges on said filter while traveling along a first optical path for causing a portion of the radiation from said first optical path which is within said passband to pass through said filter and for reflecting a remaining portion of the radiation from said first optical path so that it travels along a second optical path, and said filter being responsive to optical radiation which impinges on said filter while traveling along a third optical path for causing a portion of the radiation from said third optical path which is within said passband to pass through said filter and for reflecting a remaining portion of the radiation from said third optical path so that it travels along a fourth optical path, said first, second, third and fourth optical paths being different from each other, said filter having a substantially planar surface portion on one side thereof, said filter effecting said reflections of portions of radiation substantially at said surface portion, and wherein said first, second, third and fourth optical paths are each contained at angularly spaced locations within a side surface of an imaginary right circular cone having an axis perpendicular to said surface portion and having an apex substantially at said surface portion; and a redirecting section for causing optical radiation traveling away from said filter along said second optical path to be redirected to travel toward said filter along said third optical path.

2. An apparatus according to claim 1, wherein said first, second, third and fourth optical paths are uniformly angularly spaced around said axis of said cone.

3. An apparatus comprising:

an optical filter having a predefined passband, said filter being responsive to optical radiation which impinges on said filter while traveling along a first optical path for causing a portion of the radiation from said first optical path which is within said passband to pass through said filter and for reflecting a remaining portion of the radiation from said first optical path so that it travels along a second optical path, and said filter being responsive to optical radiation which impinges on said filter while traveling along a third optical path for causing a portion of the radiation from said third optical path which is within said passband to pass through said filter and for reflecting a remaining portion of the radiation from said third optical path so that it travels along a fourth optical path, said first, second, third and fourth optical paths being different from each other; and a redirecting section for causing optical radiation traveling away from said filter along said second optical path to be redirected to travel toward said filter along said third optical path, said redirecting section further comprising:

a first reflective surface which reflects radiation traveling along said second optical path so that it travels along a fifth optical path different from said first, second, third and fourth optical paths, and includes paths; and a second reflective surface which reflects radiation traveling along said fifth optical path so that it travels along said third optical path.

4. An apparatus according to claim 3, wherein said redirecting section includes a prism having first, second and third surfaces thereon, said first and second surfaces respectively serving as said first and second reflective surfaces, and said second and third optical paths each passing through said third surface at spaced locations thereon.

5. An apparatus according to claim 4, wherein said first, second and third surfaces are each substantially perpendicular to a plane which includes said second and third optical paths.

6. An apparatus according to claim 1, comprising:

an optical filter having a predefined passband, said filter being responsive to optical radiation which impinges on said filter while traveling along a first optical path for causing a portion of the radiation from said first optical path which is within said passband to pass through said filter and for reflecting a remaining portion of the radiation from said first optical path so that it travels along a second optical path, and said filter being responsive to optical radiation which impinges on said filter while traveling along a third optical path for causing a portion of the radiation from said third optical path which is within said passband to pass through said filter and for reflecting a remaining portion of the radiation from said third optical path so that it travels along a fourth optical path, said first, second, third and fourth optical paths being different from each other; and a redirecting section for causing optical radiation traveling away from said filter along said second optical path to be redirected to travel toward said filter along said third optical path, said redirecting section further comprising:

an optical fiber, and include fiber; and a lens section which causes optical radiation traveling along said second optical path to be directed into one end of said optical fiber, and which causes optical radiation exiting from an opposite end of said optical fiber to be directed along said third optical path.

7. An apparatus according to claim 6, wherein said lens section includes first and second optical lenses, said optical fiber having each end optically coupled to a respective one of said lenses.

8. An apparatus according to claim 6, wherein said lens section includes an optical lens, said optical fiber having each end optically coupled to said lens at respective different locations thereon.

9. An apparatus comprising:

an optical filter having a predefined passband, said filter being responsive to optical radiation which impinges on said filter while traveling along a first optical path for causing a portion of the radiation from said first optical path which is within said passband to pass through said filter and for reflecting a remaining portion of the radiation from said first optical path so that it travels along a second optical path, and said filter being responsive to optical radiation which impinges on said filter while traveling along a third optical path for causing a portion of the radiation from said third optical path which is within said passband to pass through said filter and for reflecting a remaining portion of the radiation from said third optical path so that it travels along a fourth optical path, said first second, third and fourth optical paths being different from each other; and a redirecting section for causing optical radiation traveling away from said filter along said second optical path to be redirected to travel toward said filter along said third optical path;

wherein said filter is responsive to optical radiation within said passband which impinges on said filter while traveling along a fifth optical path for causing said radiation from said fifth optical path to pass through said filter and thereafter travel away from said filter along said fourth optical path.

10. An apparatus according to claim 9, wherein said filter causes the portion of the radiation from said first optical path which passes through said filter to thereafter travel away from said filter along a sixth optical path different from said fifth optical path.

11. An apparatus according to claim 10, wherein said filter has a substantially planar surface portion on one side thereof, said filter effecting said reflections of portions of radiation substantially at said surface portion;

wherein said first, second, third and fourth optical paths are each contained at angularly spaced locations within a side surface of an imaginary right circular first cone having an axis perpendicular to said surface portion and having an apex approximately at said surface portion; and wherein said fifth and sixth optical paths are each contained at angularly spaced locations within a side surface of an imaginary right circular second cone having an axis perpendicular to said surface portion and having an apex approximately at said surface portion, said first and second cones being disposed on opposite sides of said filter.

12. An apparatus according to claim 11, wherein said first and sixth optical paths are approximately parallel and coaxial; and wherein said fourth and fifth optical paths are approximately parallel and co-linear.

13. An apparatus according to claim 10, including a primary input port which directs incoming optical radiation along said first optical path, an add input port which directs incoming optical radiation along said fifth optical path, a primary output port which receives radiation traveling along said fourth optical path, and a drop output port which receives radiation traveling along said sixth optical path.

14. An apparatus according to claim 13, wherein said input and output ports each include an optical lens which processes optical radiation traveling through that port.

15. A method comprising:

providing first and second reflective surfaces;

causing optical radiation traveling along a first optical path to impinge on an optical filter having a predefined passband in a manner so that a portion of the radiation from said first optical path which is within said passband passes through said filter and a remaining portion of the radiation from said first optical path is reflected and travels along a second optical path;

causing optical radiation traveling along a third optical path to impinge on said filter in a manner so that a portion of the radiation from said third optical path which is within said passband passes through said filter and a remaining portion of the radiation from said third optical path is reflected and travels along a fourth optical path, said first, second, third and fourth optical paths being different from each other, and redirecting optical radiation traveling away from said filter along said second optical path in a manner so that it travels toward said filter along said third optical path, wherein said redirecting step includes the steps of the optical radiation further comprises:

using said first reflective surface to reflect radiation traveling along said second optical path so that it travels along a fifth optical path different from said first, second, third and fourth optical paths, and paths; and using said second reflective surface to reflect radiation traveling along said fifth optical path so that it travels along said third optical path.

16. A method according to claim 15, including the steps of:

providing a prism which has said first and second reflective surfaces thereon; and orienting said prism so that said second and third optical paths each pass through a further surface of said prism at spaced locations thereon.

17. A method according to claim 16, wherein said orienting step is carried out in a manner so that said first and second reflective surfaces and said further surface are each substantially perpendicular to a plane which includes said second and third optical paths.

18. A method comprising:

providing an optical fiber and a lens section;

causing optical radiation traveling along a first optical path to impinge on an optical filter having a predefined passband in a manner so that a portion of the radiation from said first optical path which is within said passband passes through said filter and a remaining portion of the radiation from said first optical path is reflected and travels along a second optical path;

causing optical radiation traveling along a third optical path to impinge on said filter in a manner so that a portion of the radiation from said third optical path which is within said passband passes through said filter and a remaining portion of the radiation from said third optical path is reflected and travels along a fourth optical path, said first, second, third and fourth optical paths being different from each other; and redirecting optical radiation traveling away from said filter along said second optical path in a manner so that it travels toward said filter along said third optical path, wherein said redirecting step includes the Stops of the optical radiation further comprises:

causing optical radiation traveling along said second optical path to be directed into one end of said optical fiber; and causing optical radiation exiting from an opposite end of said optical fiber to be directed along said third optical path.

19. An apparatus according to claim 18, including the steps of:

configuring said lens section to include first and second optical lenses; and optically coupling each end of said optical fiber to a respective one of said lenses.

20. An apparatus according to claim 18, including the steps of:

configuring said lens section to include an optical lens; and optically coupling each end of said optical fiber to said lens at respective different locations thereon.

21. A method according to claim 17, including the step of causing optical radiation within said passband which impinges on said filter while traveling along a fifth optical path to pass through said filter and thereafter travel away from said filter along said fourth optical path.

22. A method according to claim 21, including the step of causing the portion of the radiation from said first optical path which passes through said filter to thereafter travel away from said filter along a sixth optical path different from said fifth optical path.

* * * * *

UNITED STATES PATENT AND TRADEMARK OFFICE
CERTIFICATE OF CORRECTION

PATENT NO. : 6,842,559 B1 Page 1 of 1
DATED : January 11, 2005
INVENTOR(S) : James M. Florence It is certified that error appears in the above-identified patent and that said Letters Patent is hereby corrected as shown below:

Column 1,
Line 10, after "predetermined" insert -- wavelength and reflects radiation at other wavelengths. --.

Column 5,
Line 5, after "spaced by" delete "$_{90}°$" and insert -- 90° --.

Column 9,
Lines 66-67, after "optical" delete "paths, and includes".

Column 10,
Line 36, after "optical" delete "fiber, and includes".
Line 65, after "first" insert -- , --.

Column 12,
Line 2, after "redirecting" delete "step includes the steps of".
Line 7, after "optical" delete "paths, and".
Line 45, after "redirecting" delete "step includes the Stops of".

Signed and Sealed this

Eleventh Day of April, 2006

JON W. DUDAS
*Director of the United States Patent and Trademark Office*